United States Patent Office 3,293,200
Patented Dec. 20, 1966

3,293,200
HUMIN MATERIAL EXTENDED-THERMOSETTING ADHESIVE, AND PROCESS OF MAKING THE SAME
Warren S. MacGregor, Camas, Wash., assignor to Crown Zellerbach Corporation, San Francisco, Calif., a corporation of Nevada
No Drawing. Filed Feb. 27, 1963, Ser. No. 261,480
6 Claims. (Cl. 260—17.2)

This invention relates to novel thermosetting adhesive compositions, to the process of producing the same, and to plywood products bonded with such adhesive compositions.

More particularly, the present invention relates to a thermosetting adhesive composition useful in the manufacture of plywood and containing, as the essential ingredients, a water-soluble phenol-aldehyde resin and a water-insoluble, finely-divided humin material obtained from the manufacture of levulinic acid by acid hydrolysis of lignocellulose.

It is well known to use phenol-aldehyde thermosetting resins as adhesives for hot-pressed plywood. It also is known to use different fillers or extenders in admixture with such resins. Among the extender or filler components which have been either used or described in technical literature are naturally occurring lignocellulosic materials, such as nut shells, endocarps of drupes, grain hulls, corn cobs, tree bark, cereal flour, wood flour, and the like. Such materials have been used either in their unmodified, finely-divided form or chemically treated, for instance, by cooking in aqueous alkaline solutions at elevated temperatures. A filler component obtained as a residue in the manufacture of furfural by acid hydrolysis of ground oat hulls or corn cobs and subsequently digested with an alkali metal hydroxide also has been proposed for compounding with phenol-aldehyde resins.

The plywood industry has been confronted within recent years with the shortage of high-grade veneers free from rough grain and other surface irregularities. In an attempt to produce high-quality plywood products it became highly important to develop modified phenolic resin synthetic adhesives which would have adequate penetration characteristics into the wood surface, which would provide a very strong bond between the plies of plywood upon hot-pressing regardless of the surface characteristics of the core and veneer stocks, which would easily transfer from spreader rolls to the surface of veneers without separating into the individual components of the adhesive, which would have a desired degree of tackiness necessary for adequate adhesion of the veneers before they are subjected to the action of heat and pressure, particularly when no prepressing operation is applied, while maintaining the total cost of the adhesive within a price range so that it would find ready commercial acceptance in the plywood industry.

It will be apparent that any method or means by which one or more of the above mentioned properties could be influenced favorably without adversely affecting other properties, would constitute a significant advancement in the art of making plywood products.

While investigating the suitability of many filler or extender materials, used either singly or in combination, in order to produce a highly satisfactory adhesive composition, I have made the discovery that by combining a water-soluble phenol-aldehyde resin with a humin material obtained as a by-product from the manufacture of levulinic acid from lignocellulose, I am able to prepare an aqueous thermosetting adhesive composition which encompasses all of the foregoing characteristics required for a highly effective plywood adhesive.

The primary object of this invention is, therefore, to provide an improved highly satisfactory aqueous thermosetting adhesive composition developed specifically for use in the manufacture of plywood products.

A further object of this invention is to provide an inexpensive plywood adhesive composition containing a mixture of a phenolic resin and waste humin material obtained as a by-product in the manufacture of levulinic acid.

A further important object of this invention is to provide a simple process of preparing such adhesive composition.

Still another equally important object of this invention is to provide a hot-pressed plywood panel of high quality using the adhesive composition of this invention in bonding the individual plies.

Any of the phenol-aldehyde resins which are employed extensively as adhesives in the manufacture of plywood are suitable in the practice of this invention. Such resins are most commonly water-soluble and are available on the market in the form of alkaline colloidal solutions or emulsions having from about 40% to about 50% resin solids. Such resins are capable of being cured to a hard insoluble product when subjected to heating at an elevated temperature. Exemplary of phenol-aldehyde resins which are suitable in the practice of this invention are those described in U.S. 2,360,376 to Van Epps, U.S. 2,437,981 to Stephan et al., and Re. 23,347 to Redfern. Other phenolic resins having similar properties and obtained by reacting phenolic compounds, such as phenol, cresol, resorcinol, and higher phenols with aldehyde, such as formaldehyde, acetaldehyde, furfuraldehyde and the like to produce a partly condensed, liquid, thermosetting, water-soluble resin are equally suitable.

The humin material used herein in combination with a phenol-aldehyde resin denotes a material which is formed as a solid residue during the manufacture of levulinic acid by acid hydrolysis of lignocellulose materials, such as wood, annual plants, waste paper containing a substantial proportion of groundwood, and the like. Finely comminuted wood, particularly softwood sawdust, is the preferred starting material for the formation of humin suitable in the practice of this invention.

Although various procedures are known for the manufacture of levulinic acid from lignocellulose, the reaction generally is carried out under severe acid hydrolysis conditions at a temperature in excess of 150° C., usually between 170° C. and 210° C. in the presence of a strong acid catalyst. During the reaction, the humin material is formed as a result of an acid breakdown of lignocellulose while substantially all of the carbohydrate portion of the lignocellulose is degraded and the hexosans converted to the desired levulinic acid. The water-insoluble solid residue, i.e., humin material, containing predominantly lignin compounds, is separated from the reaction mixture, washed and dried. Although the humin material produced during the manufacture of levulinic acid is highly suitable for use in the preparation of the adhesive compositions of this invention, other similar humin materials produced by other methods, such as wood saccharification or acid condensation of sulfite pulping spent liquors also are suitable in the practice of this invention. On the other hand, residues obtained from acid hydrolysis of pentosan-containing lignocellulose under mild conditions to yield furfural are not contemplated in the practice of this invention. Such materials contain a substantial proportion of the original unreacted carbohydrates which remain in the residues together with the lignin.

In order to make a uniform adhesive composition, the humin material should be finely divided in any suitable grinding apparatus to produce a powdery product at least 80% of which will pass through a 100-mesh screen U.S. Sieve Series, with substantially all of the material passing through 10-mesh screen. Humin materials having smaller particle size are equally suitable for admixture with a phenol-aldehyde resin.

Although the composition of the humin material may vary to a certain extent, it is composed predominantly of lignin, is substantially free of cellulose, and contains a minor proportion of degradation products and ash.

A particularly suitable humin material is available in a dry powdered form and has the following chemical composition:

| | Percent by weight |
|---|---|
| Lignin | 79 |
| Degradation products | 17 |
| Ash | 4 |

The lignin constituent in the humin material is herein defined as the Klason lignin.

The adhesive compositions of this invention may be prepared in a number of ways. Thus the humin material in a finely divided form may be admixed with the phenol-aldehyde resin in an aqueous medium using a suitable mixing apparatus capable of producing a vigorous, high sheer mixing action, and stirred until an intimate mixture of the ingredients is obtained.

If desired, the humin material may be dispersed in water and treated with a suitable alkaline agent, such as an alkali metal hydroxide or a basic alkali metal salt to produce an alkaline aqueous dispersion of the humin material.

Another way of preparing the adhesive compositions of this invention is to blend an aqueous dispersion of the humin material with a conventional filler or extender well known in the art and then combine the resulting dispersion with the phenol-aldehyde resin.

A particularly suitable conventional extender which may, optionally, be used in the adhesive composition of this invention is a cereal flour, particularly wheat flour, which may be incorporated to replace a portion of the humin material in an amount of from about 1% to about 50% by weight based on the weight of the humin material. The use of wheat flour is particularly advantageous in improving the tolerance of the adhesive composition to prolonged veneer assembly time and to minimize changes in the moisture content of the adhesive prior to hot-pressing of stacked cores and veneers.

Water may be added to the adhesive composition as necessary to attain a desired viscosity thereof. The viscosity of the final adhesive composition is significantly influenced not only by the solids content thereof but also by the quantity of the humin material, water, other fillers or extenders, and alkalinity of the adhesive. I have found that the operative viscosity range for the adhesive composition of this invention is between about 1000 and about 8000 centipoises at the temperature of about 25° C., as measured by the Brookfield viscometer. The preferred viscosity range of the adhesive composition is between about 1500 and 4500 centipoises at 25° C.

The range of operative proportions of the two essential ingredients of the adhesive composition of this invention is from about 40% to about 99% of the phenol-aldehyde resin and from about 1% to about 60% of the humin material, the percentages being expressed by weight on a dry solids basis, the preferred range being from about 65% to about 85% of the resin and from about 15% to about 35% of the humin material.

The herein described adhesive composition may be prepared by introducing the foregoing constituents in the predetermined amounts into any conventional type of a mixer or other container provided with suitable agitating means. They are then continuously mixed together, preferably at room temperature, until an aqueous adhesive composition of a substantially uniform consistency is obtained. The order of addition in combining the above constituents is not critical. However it is preferred to first disperse the finely divided humin material in water, add optionally thereto an alkaline agent as well as an additional extender, and thereafter add thereto the phenol-aldehyde resin, preferably in a few increments.

After an adhesive of a desired consistency is produced, it is spread by any conventional means over the face of a veneer in an amount which will vary with the type of plywood construction being employed and the ultimate intended use of the finished plywood. Generally an amount of from 50 lbs. to 70 lbs. of wet adhesive per thousand square feet of double glueline (MDGL) is sufficient. Plywood may be formed from veneers having a layer of the adhesive on their surface with an assembly time ranging from about 3 minutes to 30 minutes. The pressing time at a temperature of about 270°–300° F. and a pressure between 175 and 200 pounds per square inch may vary from about 3 to about 8 minutes, depending on the temperature of the platens, the number of panels per opening and other variables well known by those skilled in the art of plywood manufacture.

The presently described adhesive compositions and various methods of their preparations are further illustrated in the following examples wherein the proportions of the ingredients are given in percentages by weight on a dry solids basis.

*Example 1*

| | |
|---|---|
| Phenol-aldehyde resin | 65 |
| Humin material | 35 |

The humin material was a finely divided water-insoluble product obtained from the manufacture of levulinic acid by acid hydrolysis of Douglas fir sawdust. It contained 79% of Klason lignin, 17% of degradation products and 4% ash. Its particle size was 89% through 100-mesh screen and the entire material through 10-mesh screen U.S. Sieve Series. The resin was a water-soluble phenol-formaldehyde resin, having a 40% solids content, specific gravity 1.195 at 68° F.

The humin material was added to the resin at room temperature under continuous agitation. Sufficient water then was added with stirring until an adhesive composition of uniform consistency was produced having a viscosity of 7000 centipoises at 25° C., and a total solids content of 44.4%.

Several 3-ply and 5-ply Douglas fir panels were prepared with the above adhesive composition using wet spreads of 64 pounds per thousand square feet of double glueline. Pressing was carried out at 285° F. and 200 p.s.i. for 4 minutes. The resulting plywood panels were of highly satisfactory quality.

*Example 2*

| | |
|---|---|
| Phenol-aldehyde resin | 76 |
| Humin material | 24 |

The phenol-aldehyde resin and the humin materials were the same as employed in Example 1.

The humin material was dispersed in water used in an amount corresponding to 2.4 times of the dry weight of the humin material. Thereafter 0.4 part by weight of 50% sodium hydroxide solution and 0.24 part of sodium carbonate based on the weight of the dry humin material were added with stirring and mixing was continued for 15 minutes. The phenol-aldehyde resin was then added gradually over a period of about 25 minutes while stirring continued. The resulting adhesive had a viscosity of 1400 centipoises at 25° C. and a total solids content of 38.7% by weight.

Plywood panels were made using the resulting adhesive in the manner described in Example 1. The test results indicated that the above adhesive composition produced excellent exterior grade plywood panels.

Example 3

Phenol-aldehyde resin _____ 77.6
Humin material _____ 22.4

The humin material and the phenol-aldehyde were the same as used in Example 1. The ingredients were combined in substantially the same manner as set forth in Example 2, except that wheat flour was blended with the humin material in an amount corresponding to 25% of wheat flour based on the weight of the humin material. The resulting adhesive composition had a viscosity of 6250 centipoises at 25° C. and its total solids content was 40% by weight.

3-ply and 5-ply plywood panels were made using A-grade veneer for the faces and C-grade veneer for the inner plies and backs. The adhesive composition was applied at the rate of 55 pounds per thousand square feet of double glueline. The panels were hot-pressed under the conditions set forth in Example 1. The finished panels were subjected to the 4-hour cyclic boil test specified in Commercial Standards 45–60 Douglas fir plywood. All of the test specimens passed the above mentioned test thus indicating that the adhesive composition of this example provided plywood of excellent quality.

Example 4

Phenol-aldehyde resin _____ 79
Humin material _____ 21

The humin material and the phenol-aldehyde resin were the same as described in Example 1. The procedure and the additional ingredients were the same as in Example 3. The viscosity of the adhesive composition was 4600 centipoises at 25° C. and its total solids content was 39.1% by weight.

Three press loads of 5-ply exterior grade Douglas fir panels were prepared under conditions shown in the following table:

TABLE I

| Panel Thickness, in. | Glue Spread, lbs./MDGL | Viscosity of Glue | | Ave. A.T.[1], Min. | Pressing Conditions | | | |
|---|---|---|---|---|---|---|---|---|
| | | MacMichael | Hi-Shear | | Time, Min. | Temp., ° F. | Pressure, p.s.i. | Panel Openings |
| 7/16 | 66 | 17 | 10.6 | 17 | 7¼ | 300 | 175 | 2 |
| 9/16 | 69 | 20 | 10.0 | 12 | 6¼ | 285 | 175 | 1 |
| 13/16 | 66 | 21 | 10.7 | 16 | 7¾ | 300 | 175 | 1 |

[1] Assembly time.

Samples of the resulting plywood panels were subjected to both the cyclic boil method CS 45–60, U.S. Department of Commerce and the conventional cold water soak method. The average percentage of wood failures for each type of plywood is given hereinbelow:

TABLE II

| Plywood Thickness, inches | Percent Wood Failure | |
|---|---|---|
| | Cyclic Boil | Cold-Water Soak |
| 7/16 | 86 | 82 |
| 9/16 | 93 | 89 |
| 13/16 | 92 | 85 |

The above test results clearly indicate that the adhesive composition of this example provides excellently bonded panels of exterior grade plywood.

It will be apparent from the foregoing disclosure that the novel thermosetting adhesive composition of this invention is useful and highly satisfactory in the manufacture of plywood. It will be understood that the adhesive compositions of this invention may also be used in a wide variety of other applications and that the present invention is not limited to disclosure of the examples, but various modifications may be made without departing from the spirit of the invention as defined in the appended claims.

I claim:

1. An aqueous thermosetting adhesive composition comprising a mixture of from about 40% to about 99% of a water-soluble phenol-aldehyde resin and from about 1% to about 60% of a water-insoluble, finely divided humin material consisting of the product obtained from the manufacture of levulinic acid by severe acid hydrolysis of lignocellulose at a temperature in excess of about 150° C. but less than about 210° C., said humin material consisting essentially of lignin, degradation products and ash, and being substantially free of carbohydrates, the percentages being expressed by weight on a dry solids basis.

2. The composition of claim 1 wherein the resin is a phenol-formaldehyde resin.

3. The composition of claim 1 including from about 1% to about 50% of cereal flour based on the weight of the humin material.

4. The composition of claim 3 wherein the flour is wheat flour.

5. The composition of claim 1 wherein the lignocellulose comprises comminuted softwood.

6. An aqueous thermosetting adhesive composition for use in the manufacture of plywood comprising an intimate mixture of from about 65% to 85% of a water-soluble, thermosetting phenol-formaldehyde resin and from about 15% to about 35% of a water-insoluble, finely divided, humin material consisting of the product obtained from the manufacture of levulinic acid by severe acid hydrolysis of comminuted wood at a temperature in excess of about 150° C. but less than about 210° C., said humin material consisting essentially of lignin, degradation products and ash, and being substantially free of carbohydrates, the percentages being expressed by weight on a dry solids basis, said composition being characterized by having a viscosity at 25° C. from about 1500 to about 4500 centipoises and by providing a strong bond between plywood plies upon hot-pressing.

References Cited by the Examiner

UNITED STATES PATENTS

| 2,283,821 | 5/1942 | Schorger _____ 260—17.2 XR |
| 2,937,158 | 5/1960 | Snyder _____ 260—17.2 XR |
| 3,008,907 | 11/1961 | Williams _____ 260—17.2 XR |

WILLIAM H. SHORT, *Primary Examiner.*

E. M. WOODBERRY, *Assistant Examiner.*